Figure 1:
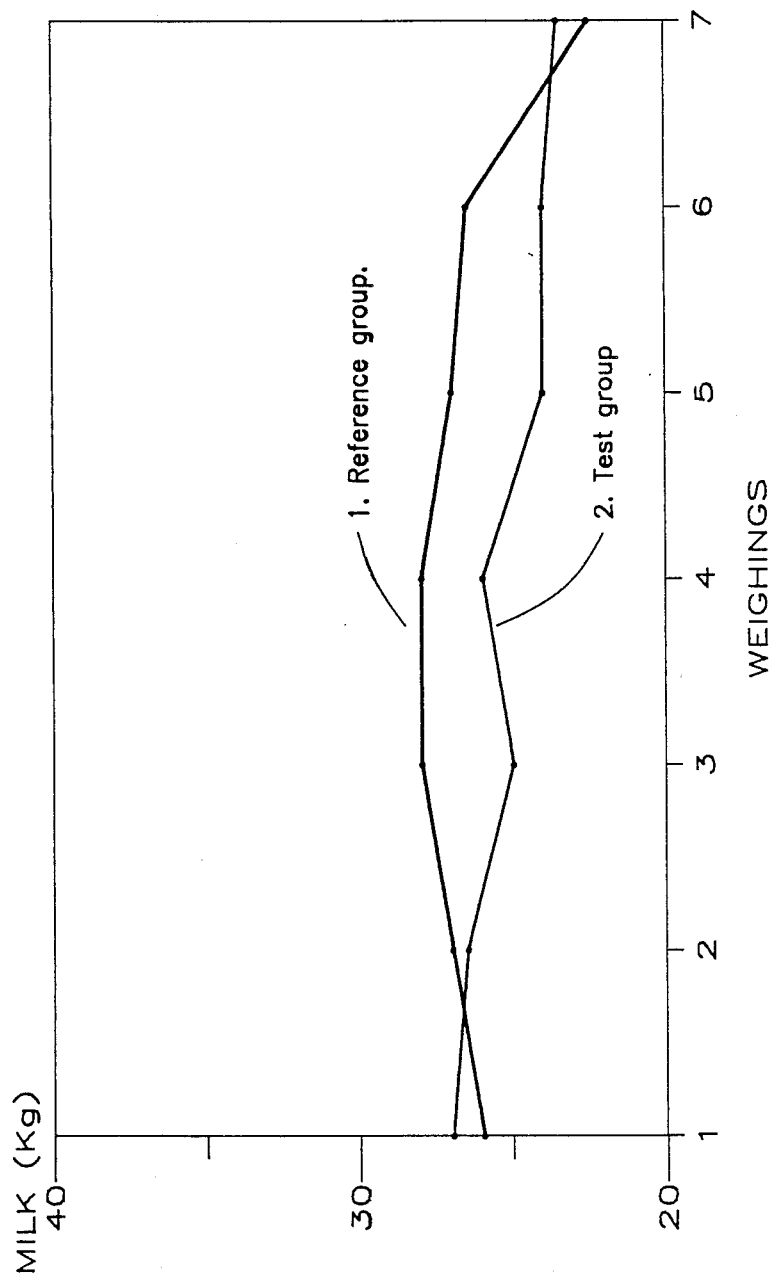

United States Patent [19]

Haarasilta et al.

[11] Patent Number: 4,954,355

[45] Date of Patent: Sep. 4, 1990

[54] FEED RAW MATERIAL AND FEED CONTAINING ZERO FIBRE AND PROCEDURE FOR PRODUCING THESE

[76] Inventors: Asko Haarasilta, Putousrinne 1 D 26, SF-01600 Vantaa; Leo Vuorenlinna, Munkkiniemen puistotie 2 B, SF-00330 Helsinki; Kalevi Laiho, Vaskihuhdantie 4-6 H 58, SF-00740 Helsinki, all of Finland

[21] Appl. No.: 175,149

[22] Filed: Mar. 30, 1988

[30] Foreign Application Priority Data

Mar. 30, 1987 [FI] Finland ................... 871389

[51] Int. Cl.$^5$ ................................................ A23K 1/00
[52] U.S. Cl. ........................................ 426/61; 426/454; 426/635; 426/658; 426/807; 426/636
[58] Field of Search ............... 426/658, 635, 636, 623, 426/630, 807, 615, 61, 454

[56] References Cited

U.S. PATENT DOCUMENTS

| | | | |
|---|---|---|---|
| 2,430,797 | 11/1947 | Zenzes | 426/636 |
| 2,504,788 | 4/1950 | Baker | 99/4 |
| 2,715,067 | 8/1955 | Kamlet | 99/2 |
| 2,878,123 | 3/1959 | Beuk et al. | 99/2 |
| 2,988,448 | 6/1961 | Hollenbeck | 99/2 |
| 3,151,983 | 10/1964 | Ely et al. | 99/4 |
| 3,212,902 | 10/1965 | Bavisotto | 99/9 |
| 3,262,783 | 7/1966 | Blanchon | 99/1 |
| 3,340,065 | 9/1967 | Pruckner et al. | 99/2 |
| 3,395,019 | 7/1968 | Kviesitis et al. | 99/2 |
| 3,597,218 | 8/1971 | Matsuoka | 99/9 |
| 3,640,723 | 2/1972 | Uhlig et al. | 99/9 |
| 4,012,535 | 3/1977 | Fiala et al. | 426/636 |
| 4,055,666 | 10/1977 | Jeffreys et al. | 426/31 |
| 4,159,224 | 6/1979 | Cederqvist et al. | 162/147 |
| 4,357,358 | 11/1982 | Schanze | 426/62 |
| 4,401,680 | 8/1983 | Young | 426/636 |
| 4,479,978 | 10/1984 | Robertiello et al. | 426/623 |
| 4,564,524 | 1/1986 | Haarasilta | 426/636 |
| 4,680,189 | 7/1987 | Schumacher et al. | 426/615 |

FOREIGN PATENT DOCUMENTS

| | | |
|---|---|---|
| 0120573 | 10/1984 | European Pat. Off. . |
| 0257996 | 3/1988 | European Pat. Off. . |
| 0280226 | 8/1988 | European Pat. Off. . |
| 0286056 | 10/1988 | European Pat. Off. . |
| 2823123 | 11/1979 | Fed. Rep. of Germany . |
| 512885 | 11/1971 | Switzerland . |
| 1122969 | 8/1968 | United Kingdom . |
| 1313417 | 4/1973 | United Kingdom . |
| 1330209 | 9/1973 | United Kingdom . |
| 2012157 | 7/1979 | United Kingdom . |
| 2055034 | 2/1981 | United Kingdom . |
| 2111366 | 7/1983 | United Kingdom . |

OTHER PUBLICATIONS

Morrison, "Feeds & Feeding", 22nd edition, Morrison Publishing Co., New York (1975) pp. 397–398.
Carlson et al., "Effects of Cellulose from *T. viride* on Nutrient Utilization by Broilers", CA0419066 Poultry Science, 1985, pp. 1536–1540.
CAB No. 0516767 (*Archiv fur Geflugelkunder*, 1986, 50, 104).
CAB No. 1551701 (*Japanese Poultry Science*, 1982, 19, 222).
CAB No. 1392477 (*Animal Feed Science and Technology*, 1981, 6, 105).
CAB No. 1389187 (*Referativnyi Zhurnal*, 1980, 58, 4.58.538).
Lemieux et al., *Science in Agriculture*, 26, 6 (1978).
Millett et al., *J. Animal Science*, 37, 599–607 (1973).
Murdock et al., *Animal Feed Science and Tech.*, 2, 287–295 (1977).

*Primary Examiner*—R. B. Penland
*Attorney, Agent, or Firm*—Merchant, Gould, Smith, Edell, Welter & Schmidt

[57] ABSTRACT

The invention concerns a feed raw material which contains zero fibre obtained as a by-product of the wood conversion industry and mainly compound of cellulose and possibly containing lignin and which is intended to be admixed to animal feed. The feed raw material contains zero fibre about 80–99% by weight, advantageously about 90% by weight, calculated as dry matter, and bonding agent binding zero fibre about 1–20% by weight, advantageously about 10% by weight. The feed raw material mix obtained in the feed raw material-preparing procedure is granulated and possibly dried. The granular feed raw material can be admixed to produce a feed according to the invention, at a concentration about 1–50% by weight, suitably about 5–40% by weight, advantageously about 10–25% by weight.

22 Claims, 1 Drawing Sheet

FEED RAW MATERIAL AND FEED CONTAINING ZERO FIBRE AND PROCEDURE FOR PRODUCING THESE

The object of the present invention is a feed raw material which contains zero fibre obtained as a by-product in the wood conversion industry, mainly consisting of cellulose and possibly containing lignin, for admixture to animal feeds, and a procedure for preparing said feed raw material. A further object of the invention is a feed containing zero fibre, mainly intended for ruminants, and a procedure for preparing said feed.

The food value of zero containing mainly short-fibre cellulose, and possibly lignin, is known since long. Zero fibre has been used to some extent, in small quantities, in silage, to improve the water uptake capacity.

Utilization of zero fibre in modern dry complete feed preparations has been inhibited by the poor manageability of this fibre. Zero fibre is obtained from the wood conversion plant in the form of an expelled product containing e.g. 70% water. The extremely finely divided zero fibre becomes, upon drying, a fine, light fluff, which is exceedingly difficult to manage when used for feed raw material. It is difficult to transport the light, poorly flowing zero fibre within the process without incurring blockages and risk of explosion. It is moreover a fact that the finely divided zero fibre has a great tendency to separate from the other components of the feed mix, for instance in the mixing and intermediate storage steps prior to granulation of the mixed feed.

The aim of the present invention is to eliminate the drawbacks mentioned. It is a particular aim of the invention, to provide a novel feed raw material containing zero fibre which can be fully utilized e.g. by ruminants.

It is a further aim of the present invention to provide a procedure which enables feed raw material containing zero fibre to be produced.

It is a further aim of the invention to provide a novel feed containing zero fibre and mainly intended for ruminants, as well as a procedure for its preparation.

As regards the features which characterize the invention, reference is made to the claims.

The feed raw material of the invention contains zero fibre obtained as a by-product in the wood conversion industry, mainly composed of cellulose and possibly containing lignin, about 80–99% by weight, advantageously about 60% by weight, calculated as dry matter, and bonding agent bonding zero fibre, about 1–29% by weight, advantageously about 10% by weight. The feed raw material is granular of its consistency, and its moisture content is, for instance, about 10% by weight.

Zero fibre is mainly composed of short-fibre cellulose. In addition, zero fibre contains lignin as little as possible, e.g. less than 30% by weight, suitably less than 20% by weight, advantageously less than 10% by weight; various extractive substances such as resin less than 10% by weight, advantageously less than 5% by weight; and ash less than 15% by weight, advantageously less than 12% by weight.

The feed prepared form said feed raw material, containing proteins and carbohydrates among others and mainly intended for ruminants, contains zero fibre about 0.8–50% by weight, suitably about 5–30% by weight, advantageously about 9–25% by weight, calculated as dry matter. The feed has granular consistency. Therefore the amount of zero fibre in the feed intended for ruminants may be in excess of 5% by weight, suitably over 10% by weight, possibly even over 20 or 25% by weight.

The task of the bonding agent is to bind the finely divided zero fibre in such a way that the feed raw material mainly consisting of zero fibre can be brought into a stable, granular state. Any substance binding zero fibre which is acceptable to animals can be used for bonding agent. Molasses is a particularly suitable bonding agent. Molasses serves as a technical adjuvant, binding the zero fibre and improving the handling properties of the feed raw material, for instance its flow characteristics after the granulation step. Molasses furthermore constitutes a flavour-improving substance, and a source of energy. Other bonding agents may equally be used, for instance starch syrup, sodium gluconate, Ca lignosulphonate and/or pentonite, or any bonding agent which is physiologically suitable for animals. Mixtures of various bonding agents may also be used.

The bonding agent, for instance molasses or any other bonding agent known in itself in the art, may be added e.g. to the dry or water-containing zero fibre, either along by itself or in conjunction with other substances which are dispensed into the feed raw material.

The feed prepared from the feed raw material contains bonding agent, e.g. molasses, about 0.01–10% by weight, suitably 0.5–3% by weight, advantageously 1–2.5% by weight, calculated on the total feed quantity.

In an advantageous embodiment the feed raw material contains hydrolase enzyme preparation 0.001–0.5% by weight of the total feed raw material weight. The hydrolase enzyme preparation contains e.g. cellulase 0.001–0.3% by weight, cellobiase 0.001–0.1% by weight and/or hemicellulase 0.001–0.1% by weight, such as xylanase 0.001–0.1% by weight, calculated on the total feed raw material weight (the enzyme dosage depends on the normal activities of commercial preparations). The enzymes are preserved in stable form in the granulated feed raw material, and they can be activated later.

The enzyme preparation to be used may be an enzyme preparation commercially known in itself, or one which is specifically produced, for instance the enzyme mix of the Finnish patent application No. 863393, in which the enzyme/enzymes has/have been admixed to a dry carrier, e.g. to cereal meal, and granulated. The enzyme preparation is advantageously added to the dry zero fibre before granulation, e.g. in a long-time conditioner, for instance during 1-2 hrs, during which time the feed raw material may also be subjected to heat treatment in order to activate the enzymes.

The enzyme preparation may also be added to the water-containing zero fibre. In that case the enzyme may be activated prior to drying the zero fibre, for cleaving the fibre.

Enzymes may also be added among the feed raw materials in connection with composition when preparing the feed of the invention.

The feed which is prepared from the feed raw material may further contain added active enzymes 0.001–1% by weight.

The enzymes cleave e.g. zero fibre into a form which is better appropriate for the animal and better digestible. In order to achieve efficient cleaving, the enzymatic activity can be activated at the stage when the feed raw material containing zero fibre is being prepared, in connection with feeding feed of the invention, e.g. when it is being mixed in water, and/or possibly still in the animal's digestive tract.

The zero fibre-containing feed raw material may, if required, also contain other substances, such as energy sources, nutrients, additives and/or adjuvants, which improve the food value of the feed raw material of its physical properties.

The feed raw material may be granulated in any way known in itself in the art. The granulated product is suitably dried to a moisture content of 10% by weight. The granular feed raw material thus obtained can be admixed to feed at a concentration of about 1–50% by weight, suitably about 5–40% by weight, advantageously about 10–25% by weight, calculated on the total feed weight.

The zero fibre-containing feed raw material and feed are favourable in price because the zero fibre gained as a by-product of the wood conversion industry is favourable. It is possible with zero fibre-containing feed raw material to replace more expensive carbohydrate sources known in the art.

Owing to its granular state, the feed raw material is stable; it will not raise dust when handled; and it does not separate from other feed raw materials when these are being mixed.

The procedure of the invention and particularly the granulation and the use of bonding agent in connection therewith enable a stable feed raw material rich in zero fibre to be prepared.

The procedure for preparing zero fibre-containing feed raw material according to the invention is simple, and it can be carried out with apparatus known in connection with feed preparation. The granular zero fibre-containing feed raw material obtained by applying the procedure enables zero fibre to be used as a raw material in the animal feed industry.

The invention is described in detail in the following with the aid of embodiment examples.

EXAMPLE 1

The composition of the zero fibre used in a feed raw material according to the invention is as follows.

| | |
|---|---|
| Lignin | less than 10% |
| Extractives (pitch, resin) | less than 5% |
| Ash | less than 12% |
| (whereof sand) | less than 2% |
| and the rest, cellulose. | |

Zero fibre is supplied from the wood conversion plant as a compressed concentrate containing 70% water and which is dried with a warm air dryer, for instance a so-called green dryer operating with concurrent flow (Swiss-Combi double shell dryer), advantageously to a moisture content of 12% by weight.

To the dry zero fibre may be added molasses, e.g. about 10% by weight, Ca lignosulphonate about 3% or pentonite about 4–5%, of the total weight of completed feed raw material. The enzyme addition, if any, may be done in connection with the adding of bonding agent. Enzymes may be added in the form of a granular premix or e.g. in the form of a commercial preparation suspended in water or as a ready-made aqueous solution. If such is desired, the enzymes may be activated for cleaving the zero fibre into a form better suitable for animals.

The feed raw material thus obtained is granulated in a pelletizer (for instance, Amandus Kahl plate matrix machine; matrix hole diameter 88 mm, hole passage length 10 mm). The enzyme addition, if any, may also be carried out at the granulation step, directly into the pelletizer.

It is possible, subsequent to granulation, to achieve for instance with a knife mechanism a zero fibre-containing feed raw material mass with crushed appearance, which can be added among the other feed raw materials as it is.

EXAMPLE 2

Comparison of Complete Feeds, using Ayrshire Bulls

The effect on productivity of zero fibre-containing complete feed was compared in a test with that of bull-fattening feed 1 Mulli Maikki (by Suomen Rehu Oy) in the raising of slaughter yearling bulls. The duration of the test was 257 days and 2×8 Ayrshire bulls were used in the test. The control group (1) received the concentrates mentioned above, and the test group (2) was fed complete feed containing 10% fine fibre. Both groups received the same amount (in kg) of concentrate. When the animals had reached a live weight of about 250 kg, the feeds were replaced with Fattening Feed 2, containing less protein, respectively with 25% of zero fibre feed. The coarse feed of both groups consisted of silage provided ad libitum. Table 2 states the quality of the feeds administered, and the consumption. The growth results of the experimental animals are stated in Table 1.

TABLE 1

| | Growth results | | | |
|---|---|---|---|---|
| Group | Mean weight at beg. of test kg | Mean weight at end of test kg | Mean growth during test per. g per day | Carcass weight kg |
| (1) Contr. | 106.3 | 429.3 | 1262 | 211.6 |
| (2) Test | 106.9 | 419.0 | 1213 | 204.7 |
| F value | | | $12.33^{MM}$ | |

TABLE 2

Quality and consumption of feeds used in the feeding test

| | Quality data | | | |
|---|---|---|---|---|
| Feed | Dry matter % | Ash %/ dry m. | Crude protein %/dry matter | Crude fibre %/dry matter |
| Concentrate 1 | 88.3 | 8.6 | 24.0 | 10.4 |
| Concentrate 2 | 88.2 | 11.1 | 17.3 | 11.3 |
| Zero fibre feed (10%) | 89.1 | 10.4 | 23.8 | 13.7 |
| Zero fibre feed (25%) | 90.4 | 10.4 | 19.3 | 18.6 |

| | Consumption | |
|---|---|---|
| Feed | Group 1 kg | Group 2 kg |
| Silage | 3732.8 | 3716.5 |
| Concentrate 1 | 281.5 | |
| Concentrate 2 | 566.8 | |
| Zero fibre feed (10%) | | 281.5 |
| Zero fibre feed (25%) | | 566.8 |

The complete feed containing zero fibre was found in this test to be palatable and a product equal to the concentrates used, in its effect on productivity.

EXAMPLE 2

Comparison of Complete Feeds, Using Beef Bulls

In this test a comparison was made between complete feeds containing normal zero fibre vs. enzymated zero fibre, regarding their effect on productivity. The test period was 223 days. In the test 3×10 Ayrshire bulls were used. The concentrate was Complete Feed 1 in the control group (1), experimental feed containing 10% zero fibre in test group (2), and feed containing the same amount of enzymated zero fibre in test group (3). Equal quantities (in kg) of concentrates were given to each group. When the live weight of the animals had reached 289–292 kg, the following feeds with lower protein content were substituted: Complete Feed 2; normal zero fibre feed 25%; and equivalent enzymated zero fibre feed 25%. Silage ad libitum was supplied for coarse feed. Table 3 gives the growth results recorded. The data concerning feed quality, and the quantities consumed, are given in Table 4.

TABLE 3

Growth results during the feeding test

| Group | Mean start weight kg | Mean end weight kg | Mean growth kg | Mean growth g/day |
|---|---|---|---|---|
| (1) | 92.3 | 364.7 | 272.4 | 1221 |
| (2) | 92.3 | 352.6 | 260.3 | 1167 |
| (3) | 92.4 | 356.5 | 264.1 | 1184 |

TABLE 4

Quality and consumption of the feeds used in the feeding test

| Feed | Dry matter % | Ash %/dry m. | Crude protein %/dry matter | Crude fibre %/dry matter |
|---|---|---|---|---|
| Complete feed 1 | 87.9 | 8.8 | 21.5 | 9.1 |
| Complete feed 2 | 88.3 | 8.6 | 18.2 | 7.1 |
| Zero fibre feed 10% (plain) | 89.1 | 10.4 | 23.8 | 13.7 |
| Zero fibre feed 25% (plain) | 90.4 | 10.4 | 19.3 | 18.6 |
| Zero fibre feed 10% (enzymated) | 88.7 | 9.4 | 22.6 | 14.3 |
| Zero fibre feed 25% (enzymated) | 90.4 | 11.2 | 21.9 | 17.0 |

| Feed | Consumption (1), kg | (2), kg | (3), kg |
|---|---|---|---|
| Silage | 2777.6 | 2838.3 | 3103.7 |
| Complete feed 1 | 286.7 | | |
| Complete feed 2 | 392.0 | | |
| Zero fibre feed 10% (plain) | | 286.7 | |
| Zero fibre feed 25% (plain) | | 392.0 | |
| Zero fibre feed 10% (enzymated) | | | 286.7 |
| Zero fibre feed 25% (enzymated) | | | 392.0 |
| Mean kg dry matter/ kg growth incr. | 4.31 | 4.65 | 4.74 |

All feeds had good palatability.

EXAMPLE 4

Comparison of Complete Feeds, Using Beef Neat

A comparison was instituted in this feeding test between Complete Feed 2 of Example 3 and an experimental feed, that is, complete feed containing 25% zero fibre, regarding their effect on productivity in raising beef yearling bulls. The test duration was 303 days. 2×8 Ayrshire bulls served as experimental animals. The control group (1) was given Complete Feed 2 and the test group (2), experimental feed. Hay was given 1.0 per animal and day, and silage was supplied ad libitum. During the test the silage had to be replaced, for a short period, with green fodder and the hay, with coxfoot straw. The growth results are stated in Table 5 and the quality and consumption of the feeds, in Table 6.

TABLE 5

Growth results

| Group | Mean start wt. kg | Mean end weight kg | Mean growth g/day | Carcass weight kg | Carcass percent. |
|---|---|---|---|---|---|
| (1) | 161.6 | 486.9 | 1074 | 250.75 | 51.6 |
| (2) Test feed | 161.3 | 485.0 | 1068 | 245.2 | 50.6 |

TABLE 6

Quality of the feeds

| | Dry matter % | Crude prot. %/dry matter | Crude fibre %/dry matter |
|---|---|---|---|
| (1) | 89.7 | 21.1 | 9.3 |
| (2) | 91.7 | 19.3 | 17.4 |

Consumption of feeds

| | (1)/kg | (2)/kg |
|---|---|---|
| (1) | 1118.00 | |
| (2) | | 1118.00 |
| Silage | 3252.90 | 3286.30 |
| Hay | 241.75 | 241.75 |
| Green fodder | 589.12 | 595.96 |

Two bulls had to be excluded from group 2 during the test owing to accidents. The bulls which had ingested concentrate containing zero fibre grew equally well in this test as those which had eaten Complete Feed 2.

EXAMPLE 5

Food Value of Zero Fibre

The value of zero fibre as neat feed was determined in this feeding test. Zero fibre was added to complete feed. The reference feed was barley, which was supplemented with crushed turnip rape so that the concentrates of the different groups had the same protein level. The aim was to keep the live weights equal in the different groups. The feeding level was 90 g dry matter per kg metabolic live weight, and the concentrate: coarse feed ratio was 45:55. The feeding was individual, that is, the feed was weighed individually for each animal. The feeding test was preceded by a two-week habituation period.

The results are given in Table 7.

TABLE 7

| | Growth and slaughter results: | | | |
|---|---|---|---|---|
| Group | Mean start weight kg | Mean end weight kg | Mean growth g/day | Carcass weight kg | Carcass percent. |
| 1. Barley + turnip rape crushed 8 animals | 309.2 | 461.4 | 1094 | 220.5 | 47.7 |
| 2. Zero fibre feed 8 animals | 312.1 | 453.9 | 1019 | 48.0 | 48.0 |

In Table 8 is stated the feed consumption during the feeding test.

TABLE 8

| | Feed | kg per animal | Food units per animal | Mean growth increment, kg |
|---|---|---|---|---|
| (1) | Barley | 384.43 | 295.05 | 5.27 |
| | Crushed turnip rape | 169.18 | 139.94 | |
| | Silage | 2239.00 | 368.56 | |
| (2) | Zero fibre feed | 503.93 | 409.17 | 5.44 |
| | Silage | 2215.65 | 362.93 | |

The calculated food value of the experimental feed, without zero fibre, was 0.884 food units per kg dry matter. In the feeding test, a food value of 0.903 food units per kg dry matter was found for the feed containing zero fibre. Thus the food unit value of zero fibre was 0.96, and the dry matter equivalent was 1.04.

There were no statistically significant differences between the test groups.

EXAMPLE 6

Concentrate Comparison Test with Milk Cows

In this feeding test experimental complete feed containing zero fibre (by Suomen Rehu Oy) was compared with conventional concentrate feed (1). The experimental feed (2) contained 10% zero fibre; the concentrate was "conventional complete feed" containing oats and dairy cattle concentrate. Silage and hay were used for coarse feed. The feeding in group (1) was: silage about 40 kg per animal per day, hay about 2 kg/an./day, oats and complete feed in proportion 1:1 (dry matter), and in group (2): silage about 40 kg/an./day, hay about 2 kg/an./day, and experimental feed. The feeding had been planned for producing about 8 kg milk (4). Weighing of the milk yield was performed every second week during the test, and fat and protein were determined four times during the test. The results are presented in Table 9.

TABLE 9

| | | Milk yields | | | |
|---|---|---|---|---|---|
| Group | Weighing period | Milk, kg average | 4% milk, kg average | Fat perc. of milk | Prot. perc. of milk |
| (1) | 1 | 25.68 | 26.04 | 4.10 | 2.87 |
| | 2 | 26.60 | 27.04 | | |
| | 3 | 27.35 | 27.95 | 4.12 | 3.03 |
| | 4 | 27.40 | 28.05 | | |
| | 5 | 26.23 | 26.85 | 4.19 | 3.02 |
| | 6 | 25.85 | 26.57 | | |
| | 7 | 21.80 | 22.33 | 4.19 | 3.13 |
| (2) | 1 | 26.85 | 27.07 | 4.03 | 3.01 |
| | 2 | 26.60 | 26.71 | | |
| | 3 | 24.98 | 25.05 | 4.02 | 3.00 |
| | 4 | 26.22 | 26.10 | | |
| | 5 | 24.48 | 24.13 | 3.93 | 3.02 |
| | 6 | 24.15 | 23.93 | | |
| | 7 | 23.73 | 23.30 | 3.94 | 3.15 |

In Table 10 are stated the quality data and consumption of the feeds.

TABLE 10

| | Quality data | | |
|---|---|---|---|
| Feed | Dry matter content | Crude protein %/dry matter | Crude fibre %/dry matter |
| (1) | 82.02 | 20.30 | 11.02 |
| Oats | 75.82 | 12.10 | 11.95 |
| (2) | 88.8 | 19.43 | 15.96 |
| Silage | 21.86 | 17.63 | 29.70 |
| Hay | 85.70 | 11.50 | 35.15 |
| Silage of tops* | 16.0 | 16.5 | 18.5 |

| | Consumption, kg/dry matter/animal/day | | | |
|---|---|---|---|---|
| Group | Oats | Test feed | Normal, compl. feed | Total |
| (1) | 3.69 | | 3.76 | 7.45 |
| (2) | | 7.49 | | 7.48 |

*Administered at beginning of test during three weeks only, on the side of grassland silage.

FIG. 1 illustrates graphically the milk yields of the cows.

The concentrates fed in this test were completely equal in effect on productivity, and the experimental feed was at least equally palatable as oats and conventional complete feed.

EXAMPLE 7

Feed Containing Zero Fibre and Energy Brain in Beef Neat Feeding

In this test, feeds containing zero fibre were studied which contained: 25% zero fibre—test feed (1)—and 10% zero fibre—test feed (2), energy brain (3), and in the control group oats (4). In feeds (1) and (2) containing zero fibre, the food unit value was further calculated for the zero fibre, assuming the values of the other components to be known. 4×7 Ayrshire bulls were used in the test. The test comprised seven four-week periods. The growth objective was 1000 g/day. The basic feed was silage. The aim was to keep the concentrates: coarse feed ratio constant so that potential differences in coarse feed intake might not affect the end result. In the test, the animals were given dry matter, on the average, 87 g/kg $w^{0.75}$. Of this, 48% on the average were concentrates. The concentrate dose in the control group and in the energy brain group (3) contained 300 g crushed turnip rape and 100 g basic mineral. The substitution figure of the oats was 0.99, and they contained crude protein 8.1%/dry matter. The turnip rape used had fat content 7.6%; substitution figure 1.11, and content of digestible crude protein 25.8%/dry matter.

The supply of crude protein averaged as follows in the different groups (g/dig. food unit/day): controls (3) 599, test feed (1) 648, test feed (2) 674, energy brain (4) 601. In Table 11 is reported the average increment growth of the experimental animals in the test, while Table 12 gives the energy concentrations and food unit figures of feed (1), (2) and (3) and Table 13, the feed compositions.

TABLE 11

| | Average increment growth (g/day) in the test | | | |
|---|---|---|---|---|
| Period | (4) | (1) | (2) | (3) |
| 1 | 520 | 582 | 638 | 474 |
| 2 | 832 | 740 | 781 | 824 |
| 3 | 1122 | 1041 | 1148 | 949 |
| 4 | 1265 | 1321 | 1311 | 1128 |
| 5 | 1719 | 1689 | 1638 | 1444 |
| 6 | 1250 | 1036 | 1128 | 1194 |
| 7 | 1000 | 892 | 778 | 1034 |

TABLE 12

| | Energy concentration | | |
|---|---|---|---|
| Group | Mean energy concentration (food units per kg dry matter) | Food unit value (food units/kg, dry matter %89) | Substitution figure (kg/food unit) |
| (1) | 1.087 | 0.967 | 1.03 |
| (2) | 1.094 | 0.074 | 1.03 |
| (3) | 1.058 | 0.942 | 1.96 |

TABLE 13

| | Feed compositions, % | | |
|---|---|---|---|
| | (1) | (2) | (3) |
| Oats | 12.465 | 12.465 | |
| Wheat bran | 2.600 | 29.700 | 22.000 |
| Molasses | 5.000 | 5.000 | |
| Cut molasses | 12.000 | 12.000 | |
| Crushed turnip rape, fatty | 17.600 | 10.000 | |
| Draff feed | 9.400 | 5.200 | |
| Powdered milk | 2.600 | 2.600 | |
| Oats | | | 9.700 |
| Oat husk powder | | | 17.000 |
| Green pellets | | | 18.000 |
| Fat mix | | | 7.000 |
| Fatty acid mix | 8.000 | 8.000 | |
| Ca lignosulphonate | 2.000 | 2.000 | 3.000 |
| Mineral and vitamin addition | 3.335 | 3.035 | 1.300 |
| Zero fibre | 25.000 | 10.000 | |

On the strength of the test that was carried out, feeds containing zero fibre are well usable in beef cattle feeding.

The above examples are merely intended to illustrate the invention, without restricting it in any way whatsoever.

We claim:

1. A ruminant feed mix comprising:
   (a) protein and carbohydrate feed material; and,
   (b) 0.8–50% by weight, calculated as dry matter, dry granular zero fibre material including:
      (i) 80–99% by weight cellulose-containing wood conversion industry zero fibre; and,
      (ii) at least 1% and not more than 20%, by weight, molasses.

2. A ruminant feed mix according to claim 1 wherein said granular zero fibre material is present in an amount of 9–25% by weight of said ruminant feed mix.

3. A ruminant feed mix according to claim 2 wherein said granular zero fibre material includes no more than 10% by weight molasses.

4. A ruminant feed mix according to claim 2 wherein said granular zero fibre material includes less than 20%, by weight, lignin.

5. A ruminant feed mix according to claim 4 wherein said granular zero fibre material includes 0.001–0.5%, by weight, hydrolase preparation.

6. A ruminant feed mix according to claim 4 wherein said granular zero fibre material includes 0.001–0.39%, by weight, cellulase.

7. A ruminant feed mix according to claim 4 wherein said granulated zero fibre material includes 0.001–0.1%, by weight, cellobiase.

8. A ruminant feed mix according to claim 4 wherein said granular zero fibre material includes 0.001–0.1%, by weight, hemicellulase.

9. A process for producing an improved feed material for ruminants; said process including steps of:
   (a) providing a dry, zero fibre mixture including:
      (i) 80–99% by weight cellulose-containing wood conversion industry zero fibre; and,
      (ii) at least 1% and no more than 20% by weight molasses;
   (b) dry granulating said zero fibre mixture to form a granulated zero fibre product; and,
   (c) admixing said zero fibre product, in an amount of 1–50% by weight, with ruminant feed, to form an admixture.

10. The process according to claim 9 wherein:
    (a) said step of providing a zero fibre mixture includes providing no more than 10%, by weight, molasses in said mixture.

11. A process according to claim 9 wherein:
    (a) said step of admixing includes providing said granulated zero fibre product in said admixture in 9–25% by weight.

12. The process according to claim 11 including a step of:
    (a) providing in said zero fibre mixture 0.001–0.5% by weight hydrolase enzyme preparation.

13. The process according to claim 11 including a step of:
    (a) providing in said zero fibre mixture 0.001–0.39% by weight cellulase.

14. A process according to claim 11 including a step of:
    (a) providing in said zero fibre mixture 0.001–0.1% by weight cellobiase.

15. A process according to claim 11 including:
    (a) providing in said zero fibre mixture 0.001–0.1% by weight hemicellulase.

16. A feed raw material useable as an ingredient in a ruminant feed mix; said feed raw material comprising:
    (a) a granular zero fibre mix including:
       (i) 80–99% by weight cellulose-containing wood conversion industry zero fibre; and,
       (ii) at least 1% and not more than 20% by weight molasses.

17. A feed raw material according to claim 16 wherein said granular zero fibre mix includes no more than 10% by weight molasses.

18. A feed raw material according to claim 16 wherein said granular zero fibre mix includes less than 20%, by weight, lignin.

19. A feed raw material according to claim 16 wherein said granular zero fibre mix includes 0.001–0.5%, by weight, hydrolase preparation.

20. A feed raw material according to claim 16 wherein said granular zero fibre mix includes 0.001–0.5%, by weight, cellulase.

21. A feed raw material according to claim 16 wherein said granulated zero fibre mix includes 0.001–0.1%, by weight, cellobiase.

22. A feed raw material according to claim 16 wherein said granulated zero fibre matrix includes 0.001–0.1%, by weight, hemicellulase.

* * * * *